(12) United States Patent
Mordini et al.

(10) Patent No.: US 8,701,549 B2
(45) Date of Patent: Apr. 22, 2014

(54) BREWING APPARATUS

(75) Inventors: Mauro Dominick Mordini, Denville, NJ (US); Michael Charles Cirigliano, Cresskill, NJ (US); Lucian Hite Lyall, III, Rancho Santa Margarita, CA (US); Christopher Milner Enright, Ladera Ranch, CA (US)

(73) Assignee: Conopco, Inc., Englewood Cliffs, NJ (US)

( * ) Notice: Subject to any disclaimer, the term of this patent is extended or adjusted under 35 U.S.C. 154(b) by 419 days.

(21) Appl. No.: 12/980,755

(22) Filed: Dec. 29, 2010

(65) Prior Publication Data

US 2012/0167774 A1  Jul. 5, 2012

(51) Int. Cl.
*A47J 31/057* (2006.01)
*A47J 31/00* (2006.01)

(52) U.S. Cl.
USPC .................................. 99/304; 99/306; 99/323

(58) Field of Classification Search
USPC .................... 99/299, 304, 306, 295, 323, 317
See application file for complete search history.

(56) References Cited

U.S. PATENT DOCUMENTS

| | | | |
|---|---|---|---|
| 4,303,525 A | | 12/1981 | Stover |
| 4,527,467 A | * | 7/1985 | Siemensma ...................... 99/279 |
| 4,642,190 A | | 2/1987 | Zimmerman |
| 5,927,179 A | * | 7/1999 | Mordini et al. ................. 99/304 |
| 6,136,366 A | | 10/2000 | Liedl, Jr. |
| 6,250,209 B1 | | 6/2001 | Pope |
| 6,786,136 B2 | | 9/2004 | Cirigliano et al. |
| 6,805,042 B2 | | 10/2004 | Mordini et al. |
| 7,235,277 B2 | | 6/2007 | Liedl, Jr. |
| 2003/0209151 A1 | * | 11/2003 | Mordini et al. ................. 99/323 |

* cited by examiner

*Primary Examiner* — Jianying Atkisson

(74) *Attorney, Agent, or Firm* — Gerard J. McGowan, Jr.

(57) ABSTRACT

An improved brewing basket, and receptacles for receiving the basket, collectively forming an improved brewing apparatus. A siphon is received within the receptacle aperture and is covered by a shroud depending from the floor of the basket. The basket is elevated with respect to the receptacle, preferably supported predominantly by the siphon. The apparatus of the invention is quite flexible, and by permitting use of a single basket for loose and filter pack teas, the complexity of manufacturing and sales is reduced. Other advantageous features include a stainless steel insert to assist in containing the siphon within the shroud, retaining tabs within the shroud to help secure the siphon, and one or more, preferably three or more, protrusions extending upwardly from the floor of the basket to assist in keeping any infusion bags from lying flat on the floor of the basket, and thereby to promote infusion. Preferably, the shroud is integral with the basket floor and extends both above and below the floor.

10 Claims, 5 Drawing Sheets

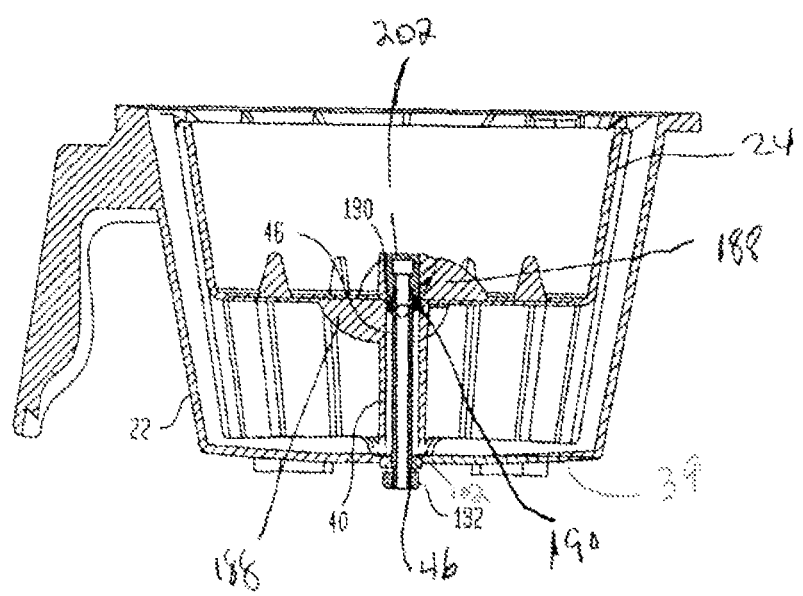

BREWING APPARATUS

BACKGROUND OF THE INVENTION

A number of documents in the patent literature disclose apparatuses for brewing tea. These include Mordini et al., US Patent Application Publication No. US 2001/0209151, Mordini et al., U.S. Pat. No. 5,927,179, Cirigliano et al., U.S. Pat. No. 6,786,136, Siemensma, U.S. Pat. No. 4,527,467, Zimmerman, U.S. Pat. No. 4,642,190, Stover, U.S. Pat. No. 4,303,525 and Pope, U.S. Pat. No. 6,250,209.

Unfortunately, improvements are still desirable, particularly in terms of convenience of use and reliable attainment of desirable temperatures.

SUMMARY OF THE INVENTION

The present invention is directed to an improved brewing basket, and receptacle for receiving the basket, collectively forming an improved brewing apparatus. The receptacle, which is also sometimes referred to in the art as a brew funnel, includes a mouth, a receptacle floor and side walls connecting the mouth and the floor. The receptacle floor includes an aperture. The brewing basket includes a basket mouth, a basket floor and side walls connecting the basket mouth and basket floor. A siphon is received within the receptacle aperture and is covered by a shroud depending from the floor of the basket. The basket is elevated, with respect to the receptacle, preferably supported predominantly by the siphon.

An advantageous feature of the invention is the removability of the basket and the presence of a gripping extension or other gripping means which can be used in removing the basket from the receptacle. The removability of the basket facilitates cleaning of the basket and improves the safety of use of the apparatus.

The apparatus of the invention is quite flexible, and by permitting use of a single basket for loose and filter pack teas, the complexity of manufacturing and sales is reduced. Other advantageous features include a stainless steel insert to assist in containing the siphon within the shroud, retaining tabs within the shroud to help secure the siphon, and one or more, preferably three or more, protrusions extending upwardly from the floor of the basket to assist in keeping any infusion bags from lying flat on the floor of the basket, and thereby to promote infusion. Preferably, the shroud is integral with the basket floor and extends both above and below the floor. More preferably, the shroud extends up to 30%, preferably 30% or less, most preferably, 20% or less of the perpendicular height of the basket. Typically, the shroud will extend at least 1% of the perpendicular height of the basket, especially at least 5% of the perpendicular height of the basket.

The siphon provides a "residence time" for the tea to pasteurize. This is accomplished by the extracted tea (or other beverage) soluble solids residing for a time greater than 50 seconds and at a temperature greater than 180 F in the lower portion of the outer basket prior to siphoning out. This is a key feature of the device.

For a more complete understanding of the above and other features and advantages of the invention, reference should be made to the following description of the preferred embodiments.

BRIEF DESCRIPTION OF THE DRAWINGS

FIG. 8 is a cross sectional view of the basket within the receptacle.

DETAILED DESCRIPTION OF THE. INVENTION

Figure 1:
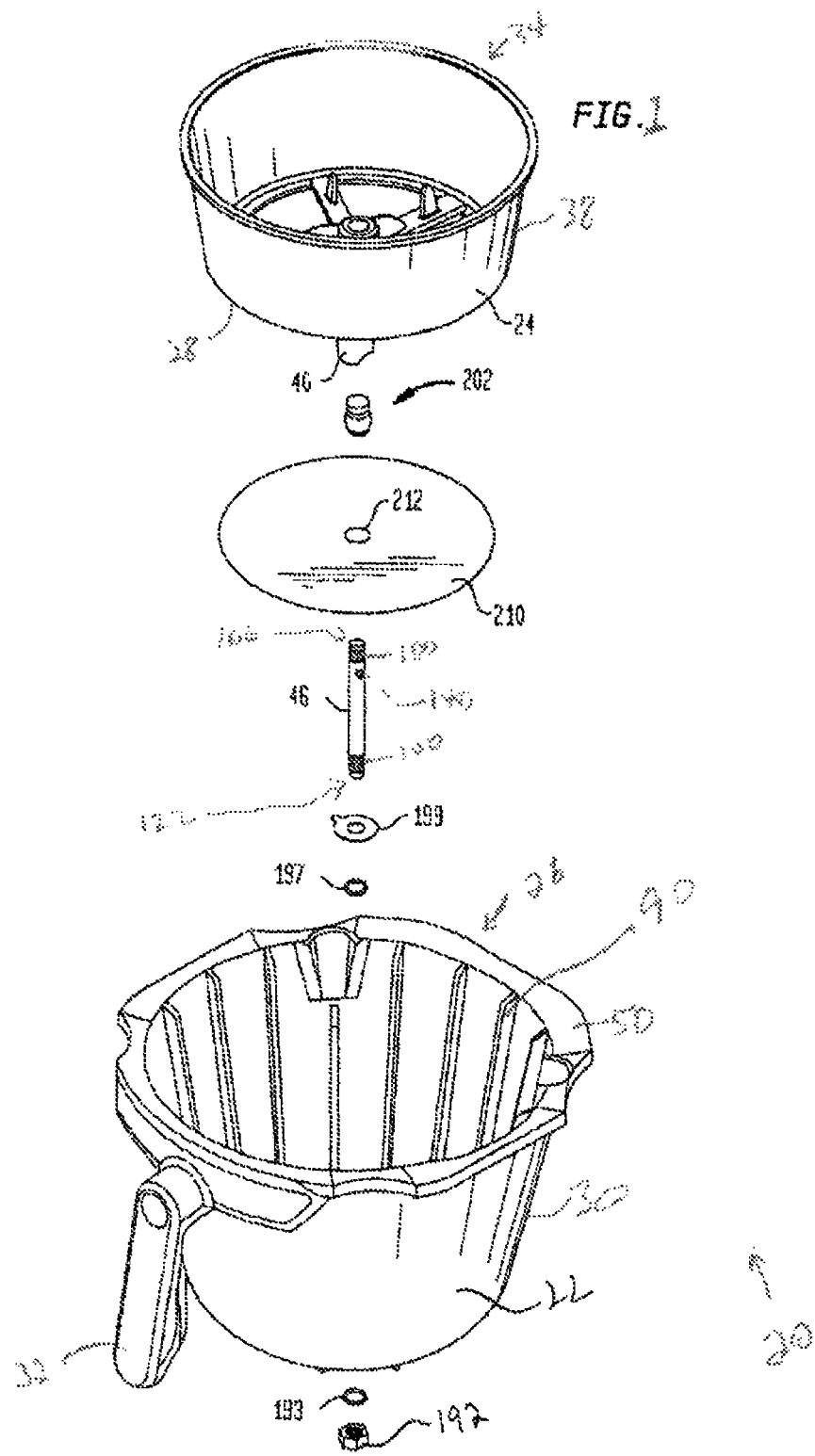
FIG. 1 is an exploded view of the receptacle plus basket of the invention.

Brewing apparatus 20 includes receptacle 22 (brewing funnel) and basket 24. Receptacle 22 includes a mouth 26 and floor 39 (FIG. 2) separated by side wall 30. Handle 32 extends outwardly and downwardly from side wall 30.

Figure 5:
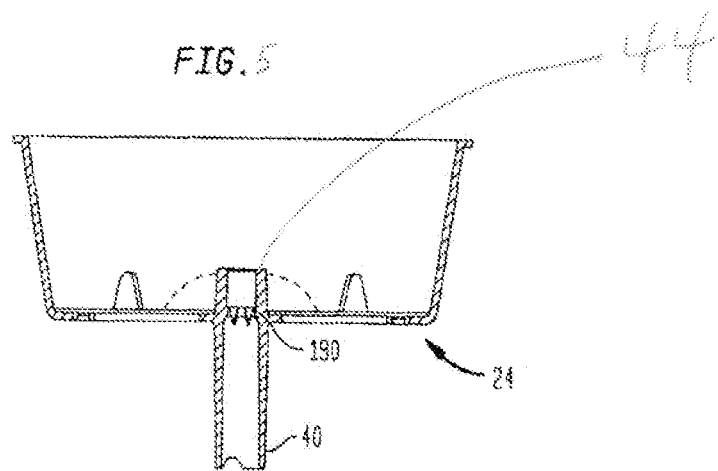
FIG. 5 is a cross section along, the lines 5-5 of FIG. 3.
Figure 7:
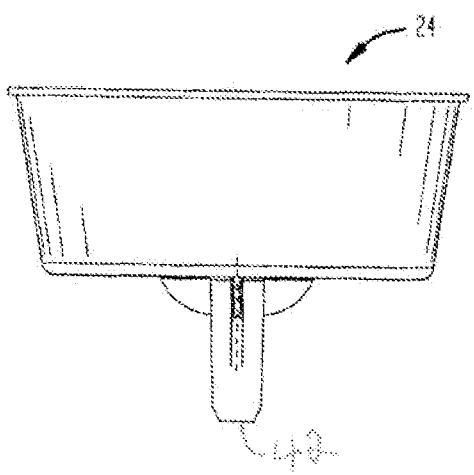
FIG. 7 is a side elevational view of the basket of FIG. 5.

Basket 24 includes mouth 34 and floor 28 connected by side will 38. Depending from floor 28 is cylindrical shroud 40 which is open at its bottom end 42 and closed at its top end 44 (FIGS. 7 and 5).

As seen in FIG. 1, receptacle 22 includes at its mouth 26 a lip 50 which varies in width along the circumference of the mouth.

Floor 28 of basket 24 includes a circular flange 80, integral with and generally perpendicular to the base of side wall 38, to which spokes 82 radiate from the top end of shroud 40. Filter screens 60 form part of the floor 28 and are separated by the spokes 82. Although six spokes can be seen in FIG. 3, any number can be used provided they are suitable to provide sufficient support for the basket while affording adequate area for the filters between the spokes to filter the tea liquid. For instance, additional spokes can be added to preserve better the integrity of the screen, e.g., the presence of more than 6 spokes may be used to strengthen the floor of the basket.

Basket 38 includes depending fins 180 extending downwardly, and medial fins, 188 extending upwardly from medial aspects of the spokes and extending laterally from the exterior of the upper end of shroud 40. Medial fins 188 and depending fins 180 serve to help stiffen the basket and to facilitate gripping of the basket, e.g., to facilitate cleaning. Upper end of shroud 40 may include a stainless steel threaded insert 202 (best seen in FIG. 8) for receiving siphon 46.

Figure 3:
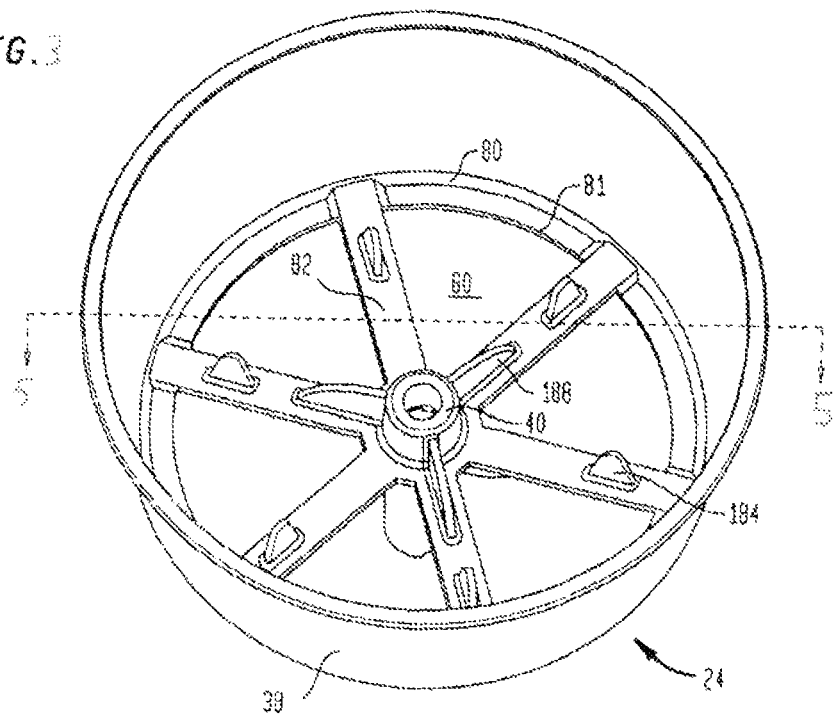
FIG. 3 is a top perspective view of the basket.
Figure 4:
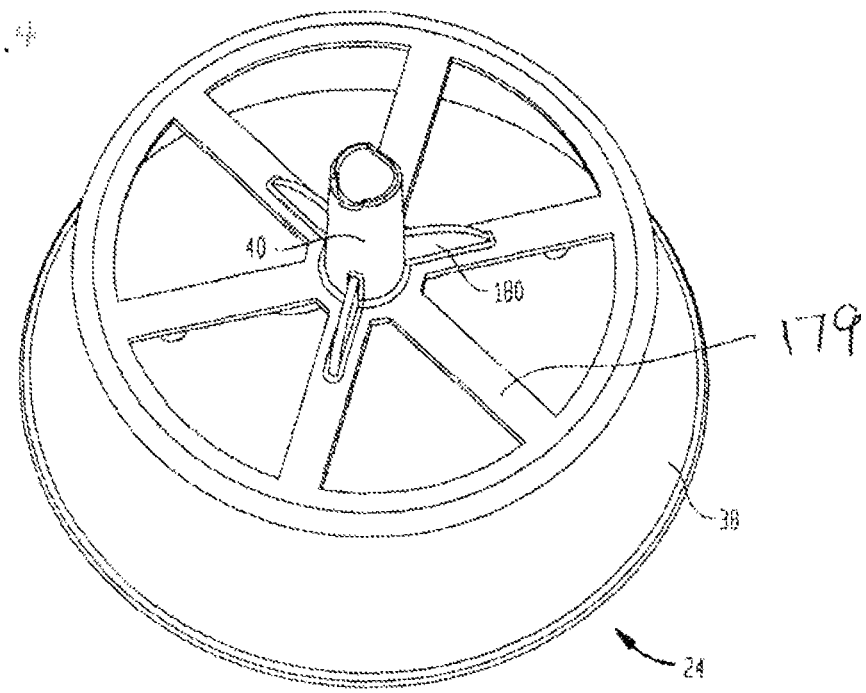
FIG. 4 is a bottom perspective view of the basket.

If desired. Fins 160 as seen in FIG. 3 may project upwardly from floor 28 of basket 24, especially from spokes 82 as illustrated, to space tea, coffee or other bags from the floor of the basket and thereby increase the surface area of the tea bags through which water or other fluid can flow. Particularly when the fins space the bottom surface of the tea bags from the floor of the basket, extraction of tea or other beverage precursor into the beverage fluid is improved. In the illustrated embodiments, the top end of shroud 40' extending above the spokes, medial fins 188 and lateral fins 160 assist in keeping any infusion bags spaced in part from the bottom of the basket and thereby to improve infusion. Use of the siphon system permits good dwell time, which is of particular use to ensure that the tea or other beverage is pasteurized.

Flange 81, spokes 82 and filters 60' may optionally be removable as a unit 179. Unit 179 may rest on a flange 80 attached to the side wall 38. The unit may be removably secured to basket 24, e.g., by screws or other means known to those of skill in the art. Removal may require twisting the unit. Alternatively, the shroud, spokes, flanges and side wall may all be integral wherein there would not form a removable unit 179.

Figure 2:
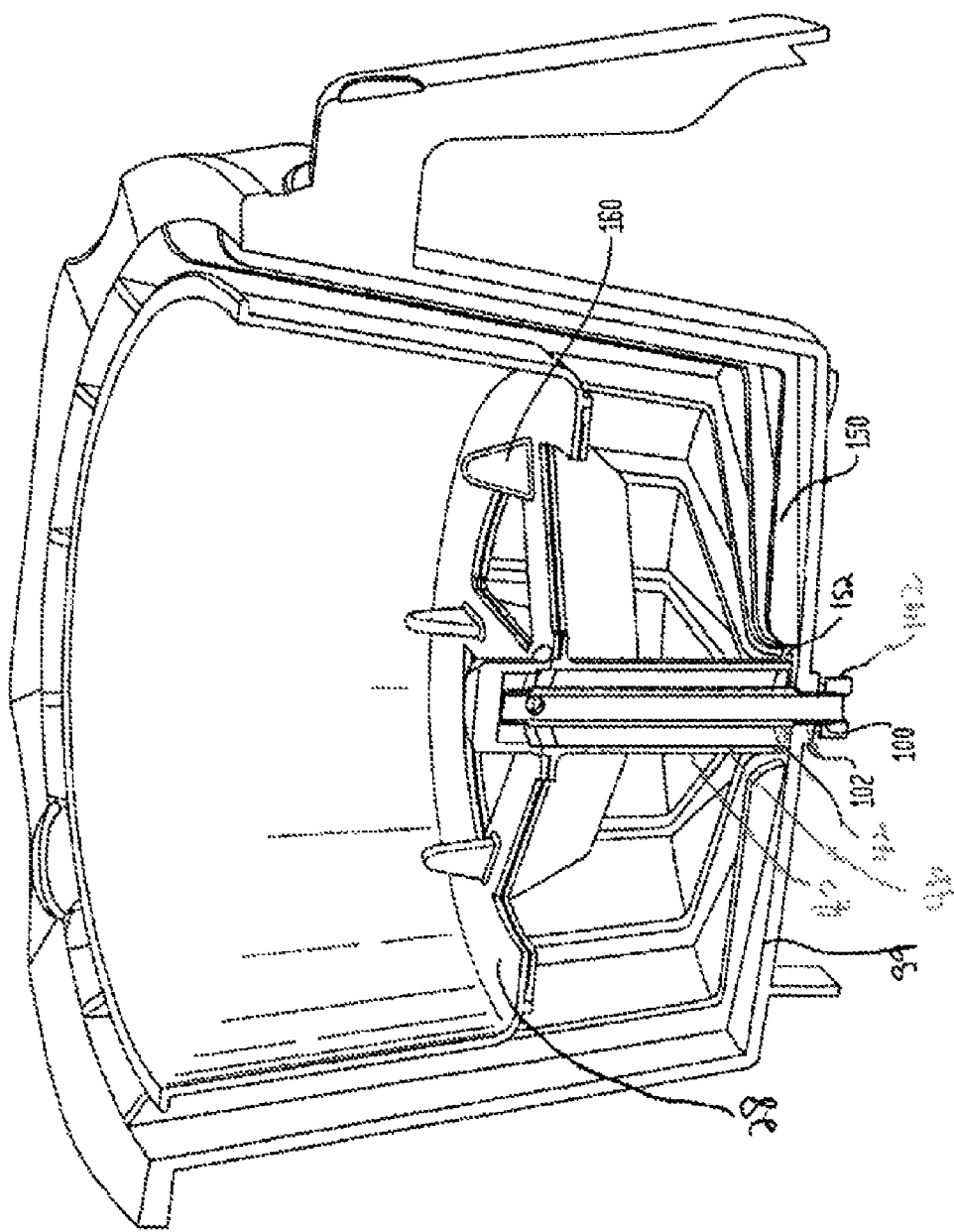
FIG. 2 is a cross sectional perspective view of our brewing apparatus.

Returning to FIG. 1, sidewall 30 of receptacle 22 includes inwardly extending protrusions 90, which can be in the form of vertically extending slats. As best seen in FIG. 2, if desired, and depending on whether floor 28 is solid or includes spokes (as seen in FIG. 13), horizontally extending slats 150 may be continued along the floor 39 of receptacle 22 horizontally toward the center of the floor, so long as they do not interfere with the placement of the shroud. Indeed, the ends of the horizontally extending slats, 150, may, if desired, define a circular flat space, 152, on the floor, which can accommodate the shroud. It will be appreciated that the protrusions may be of various shapes and are not limited to the slat shape illustrated.

Referring to FIGS. 1, 2, and 8, siphon 46 is received within the generally cylindrical interior space of shroud 40. Siphon 46 is itself generally cylindrical and includes towards its lower end external threads 100. Siphon 46 comprises a cylinder having two open ends 106, 122. In addition, toward the upper end, siphon 46 includes opposed apertures 140 (only one shown in FIG. 1, the other being on the opposite side). The bottom end 42 of the shroud is spaced from floor 39 of the receptacle. As seen in FIG. 2, siphon 46 is inserted within shroud 40 and threads 100 of shroud 40 are secured using nut 192. The lower end of the siphon is received within aperture 102 of receptacle 22. Nut 110 has internal threads 101 which are used to secure siphon 46. When the basket 24 is received within receptacle 22, siphon 46 serves to support and elevate basket 24 within receptacle 22. The siphon may be further secured within the shroud at its upper end, as best shown in FIG. 8.

Figure 6:
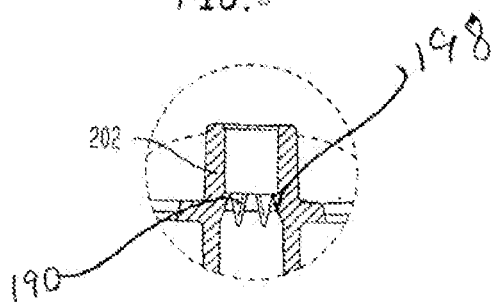
FIG. 6 is an exploded cross sectional view of the head of the shroud seen in FIG. 5.

FIG. 8 shows basket 24 received within receptacle 22. Shroud 40 accommodates most of siphon 46 therewithin. The interior wall of shroud 40' tapers inwardly at 198 to form a neck as best seen in FIG. 6. Siphon 46 is secured in place by two or more polypropylene retaining tabs 190 which are attached to neck 198, by the tapered wall, by nut 192 and by a snug fit within retaining insert 202.

FIG. 1 shows nut 192, O-ring 193, O-ring 197 and washer 199 which help to secure siphon 46 within shroud 40. In this embodiment, blind threaded insert 202 closes off the top of shroud 40, although if desired shroud 40 may be closed at the top, as seen in FIG. 2. Planar stainless steel wire mesh filter 210 having central aperture 212 may be interposed between basket 24 and receptacle 22. If no filter 210 is present, the area between the spokes will normally comprise filters. If filter 210 is included, the area between spokes may be open or it may be filter material, as desired.

In operation, siphon 46 is inserted through aperture 102 and fastened into place. Screw threads 100 are fastened through nut 192. Basket 24 is moved above and into receptacle 22 whereby shroud 40 is lowered over siphon 46. Siphon 46 supports basket 24 in an elevated position within receptacle 22.

When it is desired to prepare a beverage, such as tea or coffee, a beverage precursor which may, for example, be in the form of a powder or granule or grounds or may be the form of leaves contained within a bag or sachet, is placed within basket 24. Water or other suitable liquid is sprayed or otherwise placed on the tea and within the receptacle 24. The infused water flows through the tea, and water and dissolved tea therein passes through filter 60 in floor 28 of basket 24. The infused, water falls through the filter and onto floor 39 of receptacle 22.

As best seen in FIG. 2, when threads 100 of siphon 46 are mated to internal threads of nut 192 and mouth 42 of the shroud is positioned above open area 152 of receptacle floor 28. Infused water is free to enter the inside of the shroud, but outside of the siphon, where it travels by capillary action, or due to pressure from the water as it enters the receptacle, up to the pair 140, 142 of apertures in the siphon. The infused water enters the siphon through the apertures and then falls downwardly within the interior of the siphon and exits the bottom of the siphon through aperture 102 to be received in a vessel.

Especially for tea, the water temperature is preferably at least 165° F., especially 185-200° F. most preferably at least 195° F. The siphon provides a "residence time" for the tea to pasteurize. This is accomplished by the extracted tea (or other beverage) soluble solids residing for a time greater than 50 seconds and at a temperature greater than 180 F in the lower portion of the outer basket prior to siphoning out. This is an important feature of the device.

Typically, the basket frame (side wall, spokes, center and flange) may be made of a thermoplastic such as polypropylene or other suitable material able to withstand the temperatures necessary for the type of brewing desired. Likewise, the receptacle may be made of a thermoplastic such as polypropylene or other suitable materials able to withstand the temperatures required for the desired type of brewing. The filter is preferably made of a mesh material such as stainless steel or other desired materials suitable for withstanding, the temperatures to which it will be subjected.

The design of the apparatus may result in a smoother, tastier brew. The keys include the cleanability of the basket, and improved steeping resulting; from the design of the device. When the apparatus is used, the extract quality and yield can be expected to be facilitated by increased and complete wetting of leaf particulates and by assuring that the tea leaf sees an adequate brewing temperature to effect leaf extract pasteurization.

With the brewing apparatus of the invention, a single apparatus design can be used for both loose tea and tea bags/sachets for brewing of iced tea, herbal teas, white, green and black teas, and other beverages such as coffee and hot teas. Improved steeping facilitated by the invention helps ensure microbiological food safety.

The word "comprising" is used herein as "including, but not limited to" the specified components. The words "including" and "having" are used synonymously.

It should be understood of course that the specific forms of the invention herein illustrated and described are intended to be representative only, as certain changes may be made therein without departing from the clear teaching of the disclosure. Accordingly, reference should be made to the appended claims in determining the full scope.

What is claimed is:

1. A brewing apparatus comprising
   I. a receptacle for receiving a basket, the receptacle including
      a) a receptacle mouth,
      b) a receptacle floor connected to the receptacle mouth by one or more side walls,
      c) a receptacle interior between the receptacle mouth and the floor,
      d) a receptacle aperture in the receptacle floor,
      e) a siphon received within the receptacle aperture and extending into the interior of the receptacle,
      f) the siphon including openings at a first end within the interior of the receptacle and a second end, and
   II. an elevated basket not contacting the receptacle floor, including
      i) a basket mouth,
      ii) a basket floor connected to the mouth by one or more basket side walls,
      iii) a shroud extending through, and integral with, the basket floor, the shroud extending above and below the basket floor and enclosing at least an upper portion of the siphon wherein the shroud of the basket encloses at least 50% of the height of the siphon, the shroud extending up to 50% of the height of the basket.

2. The brewing apparatus according to claim 1 wherein the siphon has a height dimension extending approximately perpendicularly to the floor of the receptacle and the shroud of the basket encloses at least 50% of the height of the siphon.

3. The brewing apparatus according to claim 1 wherein the top of the shroud is closed by a metal insert.

4. The brewing system according to claim 3 wherein the basket is readily removable from the receptacle.

5. The brewing apparatus according to claim 1 wherein protrusions extend upwardly from the floor of the basket to assist in keeping any infusion bags from lying flat, and thereby to promote infusion.

6. The brewing system according to claim 1 wherein the shroud includes a threaded insert for receiving the siphon and the siphon is releasably attached to the insert at least in part by mating threads on the exterior of the siphon.

7. The brewing system according to claim 1 wherein the basket includes fins to facilitate gripping the basket to facilitate cleaning.

8. The brewing apparatus according to claim 1 wherein filter screens form part of the floor of the basket.

9. The brewing apparatus according to claim 1 wherein the shroud extends up to 30% or less of the height of the basket.

10. The brewing apparatus according to claim 6 wherein protrusions extend upwardly from the floor of the basket to assist in keeping any infusion bags from lying flat and thereby promote infusion, and wherein the basket includes fins to facilitate gripping the basket to facilitate cleaning.

* * * * *